(12) United States Patent  (10) Patent No.: US 12,528,432 B2
Kwak  (45) Date of Patent: Jan. 20, 2026

(54) APPARATUS AND METHOD FOR REDUCING CURRENT DRAINAGE FROM A BATTERY OF A VEHICLE

(71) Applicants: Hyundai Motor Company, Seoul (KR); Kia Corporation, Seoul (KR)

(72) Inventor: Seung Yong Kwak, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 215 days.

(21) Appl. No.: 18/226,852

(22) Filed: Jul. 27, 2023

(65) Prior Publication Data

US 2024/0190369 A1 Jun. 13, 2024

(30) Foreign Application Priority Data

Dec. 9, 2022 (KR) .......... 10-2022-0171872

(51) Int. Cl.
  *G05D 1/00* (2024.01)
  *B60L 58/12* (2019.01)
  *B60R 16/00* (2006.01)
  *B60R 16/033* (2006.01)

(52) U.S. Cl.
  CPC ............ *B60R 16/033* (2013.01); *B60L 58/12* (2019.02); *B60R 16/005* (2013.01)

(58) Field of Classification Search
  CPC ..... B60R 16/033; B60R 16/005; B60L 58/12; H02J 7/0032; H04L 12/12; H04L 2012/40215; H04L 2012/40273
  USPC .......................................................... 701/36
  See application file for complete search history.

(56) References Cited

U.S. PATENT DOCUMENTS

2020/0282860 A1* 9/2020 Kim ........................ B60L 58/10
2021/0403010 A1* 12/2021 Symanow ......... B60W 50/0225

* cited by examiner

*Primary Examiner* — Aniss Chad
*Assistant Examiner* — Hussam Aldeen Alzateemeh
(74) *Attorney, Agent, or Firm* — SLATER MATSIL, LLP

(57) ABSTRACT

Apparatus and method embodiments for reducing current-drainage from a battery of a vehicle, can include a network monitor configured to monitor a network state, a vehicle usage pattern learner configured to determine a usage pattern of the vehicle by time of each day of a week based on a monitoring result of the network monitor and determine cut-off load ranges for respective sections of the usage pattern to store in a memory, and a cut-off determiner configured to compare a time point at which the vehicle is turned off to a time range of each of the sections and accordingly determine at least one power load to cut off. In an embodiment, the vehicle usage pattern learner can be further configured to determine the sections based on a vehicle usage probability.

14 Claims, 5 Drawing Sheets

APPARATUS AND METHOD FOR REDUCING CURRENT DRAINAGE FROM A BATTERY OF A VEHICLE

CROSS-REFERENCE TO RELATED APPLICATIONS

This application claims the benefit of Korean Patent Application No. 10-2022-0171872, filed on Dec. 9, 2022, which application is hereby incorporated herein by reference.

TECHNICAL FIELD

The present disclosure relates to an apparatus and a method for reducing current-drainage from a battery of a vehicle.

BACKGROUND

In general, an in-vehicle controller such as an integrated central control unit (ICU) may minimize the loss of dark current by sequentially cutting off power supplied to loads that consume power even when a vehicle is stopped or parked, which may contribute to improving the life of a battery.

Accordingly, a typical ICU may generally cut off in phases power supplied by a battery only after a certain period of time elapses after a controller area network (CAN) enters a sleep state, according to a range of loads that is set based on the characteristics of loads.

For example, to cut off power in phases and prevent the loss of dark current in such a way, when approximately 20 minutes elapse after the CAN, an in-vehicle communication network, is switched to the sleep state, the power supply to loads (e.g., interior lamps) that may not cause any problem in safety and convenience even when they are turned off may be cut off in a first phase.

In addition, when approximately one hour elapses after the CAN enters the sleep state, the power supply to loads (e.g., seat position or multi-function switches) that are required to immediately respond to a driver's manipulation of a switch while the driver is taking a rest in the vehicle may be cut off in a second phase.

That is, such a power supply state in which power is supplied to the loads that are required to immediately respond to the driver's manipulation during the rest on the assumption of a maximal one hour for which the driver is taking a rest in the vehicle may be maintained for a certain period of time.

In addition, when approximately seven days elapse after the CAN enters the sleep state, the power supply to loads (e.g., an audio video navigation (AVN), a cluster, an air conditioner, etc.) that require a great amount of time to be booted when they are re-connected after the power is cut off by the determination that there is no plan to use the vehicle for the time being, and may thus cause inconvenience to the driver, may be cut off in a third phase.

In such a case in which the power supply is cut off in phases by the lapse of time based on the characteristics of loads as described above, there may be a problem that the power supply is maintained unnecessarily for a certain period of time, even when there is an extremely low probability that the driver uses the vehicle.

For example, even though there is a usage pattern with an extremely low probability of the vehicle being used until the next morning before the driver goes to work after the vehicle is parked when the driver leaves work on a weekday evening, a power supply state in which power continues to be unnecessarily supplied to the loads in the third phase, due to such a phased power supply cut-off, may be maintained.

SUMMARY

The present disclosure relates to an apparatus and a method for reducing unintentional current-drainage from a battery of a vehicle, thereby contributing to improving the performance of the battery.

Various embodiments of the present disclosure are directed to providing an apparatus and a method for reducing unintentional current-drainage from a battery of a vehicle, which may determine a vehicle usage pattern of a driver of the vehicle while monitoring a network state of the vehicle, learn the vehicle usage probability by time slot, and differentiate a range of loads to be cut off when the vehicle is stopped according to the vehicle usage pattern, thereby minimizing the unnecessary consumption of current and contributing to improving the performance of a battery.

An apparatus for reducing unintentional current-drainage from a battery of a vehicle, according to an embodiment of the present disclosure, includes a network monitor configured to monitor a network state, a vehicle usage pattern learner configured to determine a usage pattern of the vehicle by time of each day of a week based on a monitoring result of the network monitor, and determine cut-off load ranges for respective sections of the usage pattern to store in a memory, and a cut-off determiner configured to compare a time point at which the vehicle is turned off to a time range of each of the sections and accordingly determine at least one power load to cut off.

In at least one embodiment of the present disclosure, the vehicle usage pattern learner is further configured to determine the sections based on a vehicle usage probability.

In at least one embodiment of the present disclosure, the vehicle usage pattern learner is further configured to determine at least one predetermined cut-off load range to apply for each of the sections according to the vehicle usage probability.

In at least one embodiment of the present disclosure, the at least one predetermined cut-off load range includes a first-phase cut-off load range, a second-phase cut-off load range, and a third-phase cut-off load range, and wherein the first to third-phase cut-off load ranges are all set to be applied when the vehicle usage probability is less than 20%.

In at least one embodiment of the present disclosure, both the first and second-phase cut-off load ranges are set to be applied when the vehicle usage probability is equal to or greater than 20% and less than 70%.

In at least one embodiment of the present disclosure, only the first-phase cut-off load range is set to be applied when the vehicle usage probability is equal to or greater than 70% and less than 90%.

In at least one embodiment of the present disclosure, the cut-off load ranges are differently set in phase, and wherein the vehicle usage pattern learner is further configured to determine one of the cut-off load ranges for each of the sections and the cut-off determiner is further configured to determine to apply the one and lower phase one of the cut-off load ranges for the each of the sections.

In at least one embodiment of the present disclosure, the apparatus further comprises a cut-off range changer configured to change a cut-off load range for a section when the section is changed by time.

In at least one embodiment of the present disclosure, the cut-off range changer is further configured to change the cut-off load range to a higher phase one when the vehicle usage probability for the section decreases.

In at least one embodiment of the present disclosure, the cut-off range changer is configured to change the cut-off load range to a lower phase one when the vehicle usage probability for the section increases and connect a power load that is not cut off in the changed section before the changed section starts.

A method of reducing unintentional current-drainage from a battery of a vehicle, according to an embodiment of the present disclosure, includes a network monitoring step of an integrated central control unit (ICU) provided in the vehicle monitoring a network state, a vehicle usage pattern learning step of the ICU determining a usage pattern of the vehicle by time of each day of a week based on a monitoring result of the network monitor, and determining cut-off load ranges for respective sections of the usage pattern to store in a memory, and a cut-off range determining step of the ICU comparing a time point at which the vehicle is turned off to a time range of each of the sections and accordingly determining at least one power load to cut off.

In at least one embodiment of a method, the vehicle usage pattern learning step includes determining the sections based on a vehicle usage probability.

In at least one embodiment of a method, the vehicle usage pattern learning step further includes determining at least one predetermined cut-off load range to apply for each of the sections according to the vehicle usage probability.

In at least one embodiment of a method, the at least one predetermined cut-off load range includes a first-phase cut-off load range, a second-phase cut-off load range, and a third-phase cut-off load range, and the first to third-phase cut-off load ranges are all set to be applied when the vehicle usage probability is less than 20%.

In at least one embodiment of a method, both the first and second-phase cut-off load ranges are set to be applied when the vehicle usage probability is equal to or greater than 20% and less than 70%.

In at least one embodiment of a method, only the first-phase cut-off load range is set to be applied when the vehicle usage probability is equal to or greater than 70% and less than 90%.

In at least one embodiment of a method, the method further comprises a cut-off range changing step of changing a cut-off load range for a section when the section is changed by time.

In at least one embodiment of a method, the cut-off range changing step includes changing the cut-off load range to a higher phase one when the vehicle usage probability for the section decreases.

In at least one embodiment of a method, the cut-off range changing step includes changing the cut-off load range to a lower phase one when the vehicle usage probability for the section increases and connect a power load that is not cut off in the changed section before the changed section starts.

A non-transitory computer-readable storage medium, according to an embodiment of the present disclosure, stores computer-readable instructions to cause a computer processor to perform the method described above.

According to various embodiments of the present disclosure as described above, differentiating a range of loads to be cut off when a vehicle is stopped according to a driver's vehicle usage pattern may minimize unnecessary consumption of current and may thus contribute to improving the performance of a battery.

In addition, cutting off power supply to loads in first, second, and third cut-off phases altogether based on a vehicle usage pattern by day of the week and by time slot, and changing in advance such a cut-off range to a state in which the vehicle is immediately available at a time point at which the driver is highly likely to use the vehicle, may minimize the loss of dark current, without compromising the driver's convenience.

Additional advantages and features of embodiments of the present disclosure will be set forth in part in the description which follows and in part will become apparent to those having ordinary skill in the art upon examination of the following or may be learned from practice of the disclosure. Other advantages of embodiments of the disclosure may be realized and attained by the structure particularly pointed out in the written description and claims hereof as well as the appended drawings.

DETAILED DESCRIPTION OF ILLUSTRATIVE EMBODIMENTS

Figure 1:
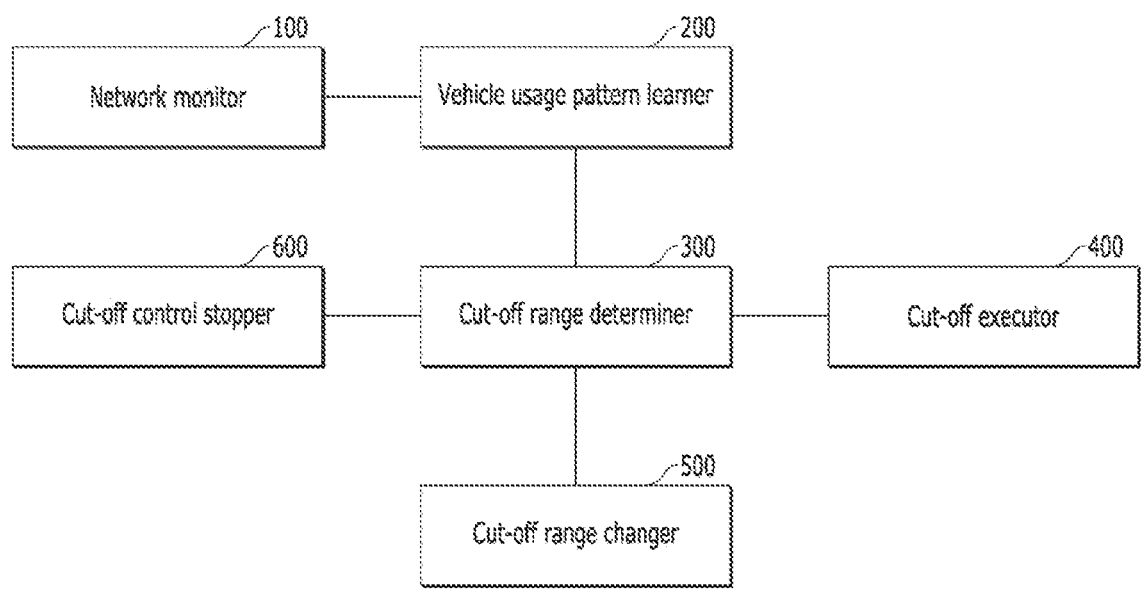
FIG. 1 is a block diagram illustrating a dark current cut-off apparatus of a vehicle according to an embodiment of the present disclosure.

Hereinafter, embodiments of the present disclosure will be described in detail with reference to the accompanying drawings, and the same or similar elements can be given the same reference numerals regardless of reference symbols, and redundant description thereof can be omitted. In the following description, the terms "module," "unit," and/or "-er/or" for referring to elements are assigned and used interchangeably in consideration of the convenience of description, and thus the terms per se do not necessarily have different meanings or functions. Further, in describing the embodiments of the present disclosure, when it is determined that a detailed description of related publicly known technology may obscure the gist of the embodiments described herein, the detailed description thereof can be omitted. The accompanying drawings are used to illustrate various technical features, and it should be understood that the embodiments presented herein are not limited by the accompanying drawings. As such, the present disclosure should be construed to extend to any alterations, equivalents, and substitutes, in addition to those that are particularly set out in the accompanying drawings.

Although terms including ordinal numbers, such as "first," "second," and the like, may be used herein to describe various elements, the elements are not limited by these terms. These terms are only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression can include the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, the term "unit" or "control unit" included in the name of an integrated central control unit (ICU) or electronic control unit (ECU) is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Hereinafter, embodiments of the present disclosure will be described in detail with reference to FIGS. 1 to 5.

FIG. 1 is a block diagram illustrating a dark current cut-off apparatus of a vehicle according to an embodiment of the present disclosure.

Referring to FIG. 1, a dark current cut-off apparatus of a vehicle according to an embodiment of the present disclosure may include a network monitor 100 configured to determine whether an in-vehicle network is in a sleep or wakeup state. A vehicle usage pattern learner 200 can be configured to derive a driver's vehicle usage pattern by day of the week and time unit based on a network monitoring result, differentially set and store in a memory a range of loads to be cut off in each section of the derived vehicle usage pattern. A cut-off determiner 300 can be configured to compare a time point at which the vehicle is turned off to a time range included in each section of the vehicle usage pattern and determine a load to which power supply from a battery is to be cut off. A cut-off executor 400 can be configured to cut off all at once the power supply to loads included in the range determined by the cut-off determiner 300.

In this case, the network monitor 100, the vehicle usage pattern learner 200, the cut-off determiner 300, and the cut-off executor 400 can, each or in one or more integrated forms of two or more of them, include a processor (e.g., computer, microprocessor, CPU, ASIC, circuitry, logic circuits, etc.) and a non-transitory computer-readable storage medium storing computer readable instructions for performing by being executed by the processor the functionalities described below, for example. The instructions can be programmed in the form of software and provided in a control device such as an integrated central control unit (ICU) or an electronic control unit (ECU) of the vehicle or provided in the form of hardware such as a module and the like, for example. As an example of the control device, an ICU is provided as shown in FIGS. 2 and 3, but examples of which are not limited thereto, and various control devices can be implemented.

The network monitor 100 can monitor whether the in-vehicle network is in the sleep state or the wakeup state by time for each day of the week, in the ICU.

Figure 2:
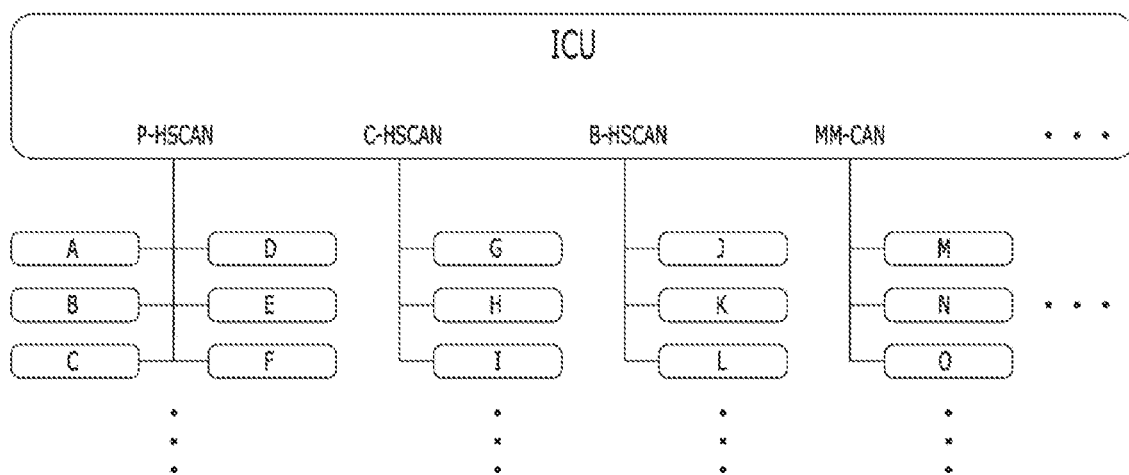
FIG. 2 is a diagram illustrating an example of monitoring a network state by an integrated central control unit (ICU) connected to controllers in a vehicle according to an embodiment of the present disclosure.
Figure 3:
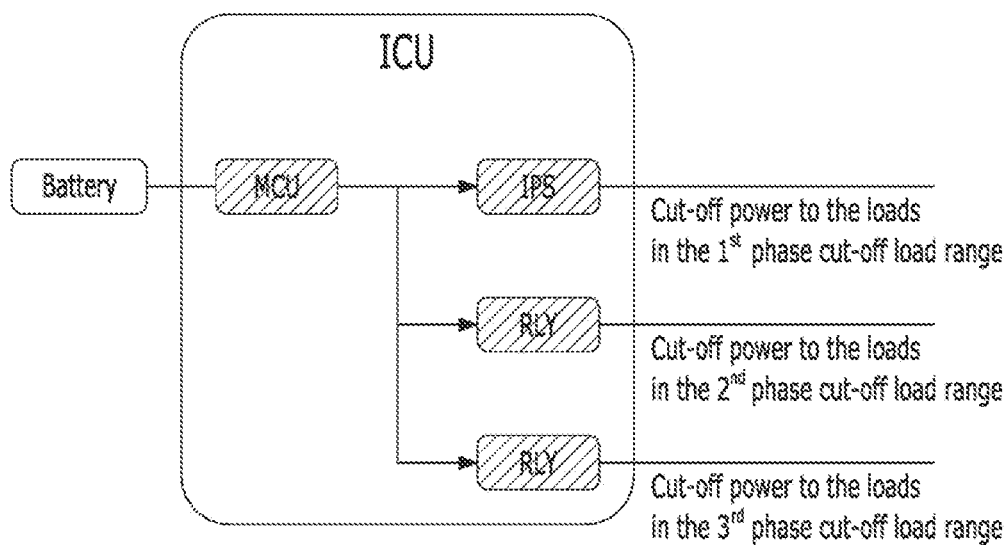
FIG. 3 is a diagram illustrating an example of cutting off power supply to each load in a vehicle by an ICU according to an embodiment of the present disclosure.

The ICU can function as a gateway of the in-vehicle network as shown in FIG. 2, and thus the network monitor 100 can use the ICU to identify whether controller area network (CAN) communication is performed between controllers and monitor whether the network is in the sleep state or the wakeup state. FIG. 2 shows data transmission and reception between numerous controllers including from controller A to controller O through CAN communication using the ICU as a gateway.

In addition, the vehicle usage pattern learner 200 can derive the driver's vehicle usage pattern by determining whether the vehicle is used by time for each day of the week, based on a monitoring result obtained by the network monitor 100.

That is, the vehicle usage pattern learner 200 can calculate a vehicle usage probability by time of each day of the week by determining that the vehicle is not used when the vehicle network is in the sleep state and determining that the vehicle is used when the vehicle network is in the wakeup state.

Accordingly, for example, the vehicle usage pattern learner 200 can calculate the vehicle usage probability to be 5% in a plurality of time sections, for example, time sections between 12:00 am and 1:00 am, 1:00 am and 2:00 am, 2:00 am and 3:00 am, and 3:00 am and 4:00 am, in the early morning on weekdays when the driver sleeps after leaving work, and calculate the vehicle usage probability to be 95% in a plurality of time sections, for example, time sections between 7:00 am and 8:00 am and 8:00 am and 9:00 am, in the morning on weekdays when the driver frequently uses the vehicle to go to work.

The vehicle usage pattern learner 200 can calculate the vehicle usage probability by time section in such a way as described above, but it can also be desirable to calculate the vehicle usage probability in consideration of the day of the week in addition to the time sections because the time sections for using the vehicle can be different on weekdays and weekends.

In addition, the vehicle usage pattern learner 200 can set a plurality of sections by grouping the vehicle usage probabilities for each predetermined range, and differentially set and store in the memory a power load to which the power supply from the battery is to be cut off in each section when the vehicle is stopped.

In this case, the vehicle usage pattern learner 200 can determine whether to cut off the power supply for each controller to cut off the power supply from the battery to a load provided in the vehicle in order to cut off dark current, but for the convenience of application of the present embodiment, can be configured to cut off all at once preset first-phase, second-phase, and third-phase cut-off loads, which correspond to a typical phased cut-off method.

That is, in the case of a low vehicle usage probability, there can be a need to minimize the loss of dark current by increasing the number of loads to be cut off, and in the case of a high vehicle usage probability, there can be a need to reduce the number of loads to be cut off to enable a fast response to the use of the vehicle by the driver. Thus, in consideration of such a situation, a range of loads (or a load range) can be set likely as a first-phase cut-off load range, a second-phase cut-off load range, and a third-phase cut-off load range, which can be applied sequentially in phase only by a time basis in the conventional method.

Figure 5:
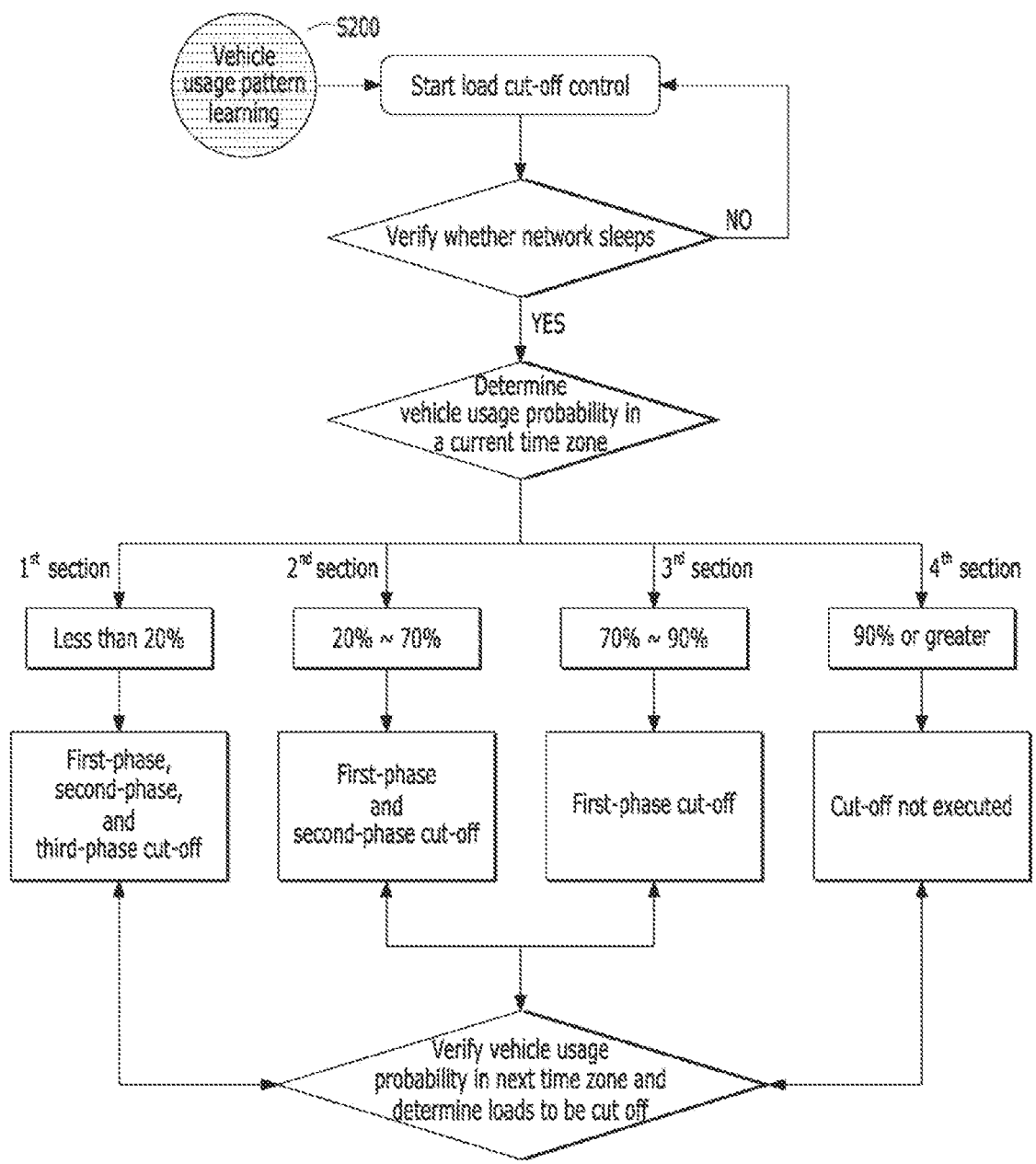
FIG. 5 is a flowchart illustrating an operating mechanism for cutting off dark current of a vehicle according to another embodiment of the present disclosure.

Accordingly, as shown in FIG. 5, the vehicle usage pattern learner 200 can set a case in which the vehicle usage probability is less than 20% as a first section, and set the power supply to the first-phase cut-off load range and the second-phase cut-off load range, even to the third-phase cut-off load range that requires a great amount of time to be booted when re-connected, to be cut off altogether, because the driver is unlikely to use the vehicle during a time slot corresponding to the first section, for example.

In addition, the vehicle usage pattern learner 200 can set a case in which the vehicle usage probability is 20% or greater to less than 70% as a second section, and set the power supply only to the first-phase cut-off load range and the second-phase cut-off load range, excluding the third-phase cut-off load range, to be cut off altogether, because the driver occasionally uses the vehicle during a time period corresponding to the second section, for example.

In addition, the vehicle usage pattern learner 200 can set a case in which the vehicle usage probability is 70% or greater to less than 90% as a third section, and set the power supply only to the first-phase cut-off load range to be cut off because the driver frequently uses the vehicle during a time period corresponding to the third section, for example.

In addition, the vehicle usage pattern learner 200 can set a case in which the vehicle usage probability is 90% or greater as a fourth section, and set the power supply to all the loads not to be cut off because the driver is expected to use the vehicle during a time slot corresponding to the fourth section, for example.

In this case, examples are not limited to the foregoing, and the vehicle usage pattern learner 200 can also set differently a range of the vehicle usage probability that is used to set each section, set differently a load range of loads to which the power supply is cut off in each section, or perform the setting by increasing or decreasing the number of sections.

As described above, cutting off altogether the loads up to the third-phase cut-off load range without preparing for the use of the vehicle by the driver in the time period corresponding to the first section, and cutting off altogether the first-phase cut-off load range and the second-phase cut-off load range without waiting for the lapse of time in the time period corresponding to the second section, can prevent unnecessary consumption of battery power even in the case of a low vehicle usage probability.

In addition, the cut-off determiner 300 can, via the ICU, compare a current time to the time zone in a section matched to the vehicle usage pattern and specify a time period in a section to which the current time belongs, and determine a load cut-off range matched to the specified section as a range of loads to be cut off altogether in a current state.

The cut-off determiner 300 can narrow the range of loads to be cut off as the vehicle usage probability increases, and expand the range of loads to be cut off as the vehicle usage probability decreases. Accordingly, for example, the cut-off determiner 300 can set a second load to be further cut off in the second section in which the vehicle usage probability is low, along with a first load that is cut off in the third section, and can set even a third load to be cut off in the first section in which the vehicle usage probability is lower than that in the second section, along with the first load and the second load.

The cut-off executor 400 can cut off all at once the power supply to loads included in the cut-off range matched to the specified section, via the ICU, and can accordingly cut off the loss of dark current.

That is, a microcontroller unit (MCU) provided in the ICU can cut off loads corresponding to the first-phase load range using an intelligent power switch (IPS) when 20 minutes elapse after a CAN sleeps, cut off loads corresponding to the second-phase load range using a relay (RLY) when one hour elapses after the CAN sleeps, and cut off loads corresponding to the third-phase load range using a relay (RLY) when seven days elapse after the CAN sleeps, as shown in FIG. 3.

However, in an embodiment, the cut-off executor 400 can selectively cut off loads corresponding to a load range matched to each section by, for example, cutting off all the loads of the first-phase cut-off load range, the second-phase cut-off load range, and the third-phase cut-off load range corresponding to the load range determined by the cut-off determiner 300, cutting off the loads of the first-phase cut-off load range and the second-phase cut-off load range simultaneously, or cutting off only the loads of the first-phase cut-off load range, without determining the lapse of time, for example.

In addition, the dark current cut-off apparatus according to an embodiment of the present disclosure can further include a cut-off range changer 500 (see FIG. 1) configured to, in a case in which the section specified by the cut-off determiner 300 is changed, change a range of loads to be cut off (or simply a load range herein) in response to the changed section.

That is, because the vehicle usage pattern learner 200 can set a cut-off range based on the vehicle usage probability calculated by time of each day of the week, the vehicle usage probability can thus be changed when time elapses in a stopped or parked state of the vehicle, for example.

Accordingly, in an embodiment, when a section that is the basis for determining the cut-off range is changed by the lapse of time, the cut-off range changer 500 can control the cut-off range to be changed in response to a load range corresponding to the changed section.

As an example of changing the cut-off range, when the vehicle usage probability is changed from the third section to the first section by the lapse of time, the cut-off range changer 500 can immediately change a state from a state in which only the loads of the first-phase cut-off load range is cut off to a state in which all the loads of the second-phase cut-off load range and the third-phase cut-off load range are cut off.

That is, when the vehicle usage pattern is changed from a section with a narrow range of loads to be cut off to a section with a wide range of loads to be cut off as the vehicle usage probability decreases by the lapse of time, the cut-off range changer 500 can expand the range of loads to be cut off, for example.

In addition to expanding the range of loads to be cut off in this way, in an embodiment, when the vehicle usage probability is changed from the first section to the second section by the lapse of time, the cut-off range changer 500 can connect the loads of the third-phase cut-off load range before the second section starts, thereby improving the driver's convenience in using the vehicle.

That is, when the vehicle usage pattern is changed from a section with a wide range of loads to be cut off to a section with a narrow range of loads to be cut off as the vehicle usage probability increases by the lapse of time, the cut-off range changer 500 can reduce the range of loads to be cut off by connecting beforehand a load that is not cut off in the changed section before the changed section starts.

In this case, for example, when the first section is changed to the second section, the cut-off range changer 500 can execute pre-booting by connecting the loads of the third-phase cut-off load range that requires a great amount of time to be booted a certain period of time (e.g., approximately 10 minutes) before the second section starts, and can then connect all the loads of the first-phase cut-off load range and the second-phase cut-off load range at a time point (e.g., approximately 10 am) at which the second section starts, thereby contributing to the driver's convenience in using the vehicle.

In this case, for example, by subdividing and changing a time unit for setting the vehicle usage pattern derived from the vehicle usage pattern learner 200 to a unit of minutes or seconds instead of a unit of one hour, customized load cut-off control that is more specialized for each driver's vehicle usage pattern can be enabled.

As described above, in an embodiment, the cut-off range changer 500 can automatically change a state to a state in which the vehicle is immediately available at a time point at which the driver's vehicle usage probability is high, while the power supply to the loads of the first-phase, second-phase, and third-phase cut-off load range is cut off altogether based on the vehicle usage pattern for time of each day of the week, which can minimize the loss of dark current without compromising the driver's convenience and contribute to improving the performance of a battery.

In addition, when the driver does not desire load cut-off control based on the vehicle usage pattern, the dark current cut-off apparatus according to an embodiment of the present disclosure can further include a cut-off control stopper 600 configured to stop executing the load cut-off control by using, for example, a mobile application installed on a smartphone owned by the driver or an AVN provided in the vehicle.

Accordingly, in an embodiment, in a case in which the driver uses the vehicle for an unusual event such as a trip or a business trip, it is possible to prevent inconvenience that can be caused by an undesirable cut-off of the power supply to loads from a past vehicle usage pattern.

In an embodiment, the cut-off control stopper 600 can then set the load cut-off control to be automatically activated again when a predetermined amount of time (e.g., 24 hours) elapses after the load cut-off control is stopped, and can also set the load cut-off control to be activated again only by direct manipulation by the driver.

Hereinafter, a dark current cut-off method of a vehicle according to an embodiment of the present disclosure will be described with reference to FIGS. 4 and 5.

Figure 4:
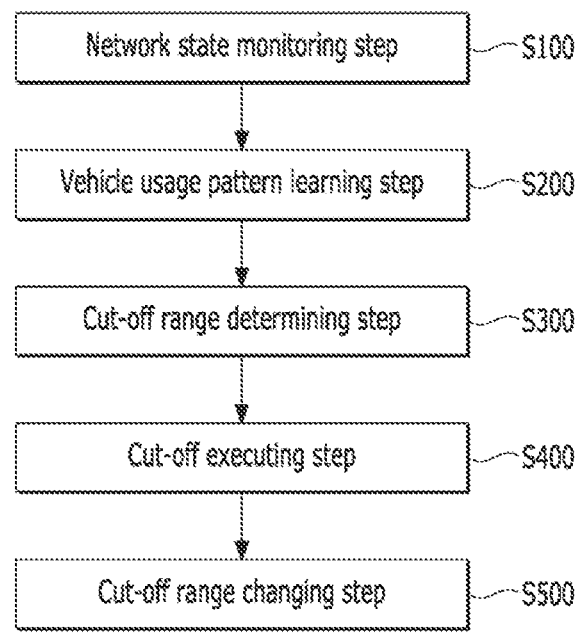
FIG. 4 is a diagram illustrating an example of a vehicle dark current cut-off method according to another embodiment of the present disclosure.

FIG. 4 is a diagram illustrating an example of a dark current cut-off method of a vehicle according to an embodiment of the present disclosure, and FIG. 5 is a flowchart illustrating an operating mechanism for cutting off dark current of a vehicle according to an embodiment of the present disclosure.

Referring to FIG. 4 and FIG. 5, the dark current cut-off method according to an embodiment of the present disclosure can include a network state monitoring step S100 in which an ICU provided in the vehicle determines whether an in-vehicle network is in a sleep or wakeup state. In a vehicle usage pattern learning step S200, the ICU can derive a driver's vehicle usage pattern by day of the week and time unit based on a network monitoring result, and differentially sets and store in a memory a range of loads to be cut off in each section of the derived vehicle usage pattern. In a cut-off range determining step S300, the ICU can compare a time point at which the vehicle is turned off to a time range included in each section of the vehicle usage pattern and determine a load to which power supply from a battery is to be cut off. And in a cut-off executing step S400, the ICU can cut off all at once the power supply to loads included in the determined range.

The network state monitoring step S100 can monitor, via the ICU functioning as a gateway for CAN communication, whether CAN communication is performed between controllers by day of the week and time units.

In addition, the vehicle usage pattern learning step S200 can determine whether the driver uses the vehicle by day of the week and time units, and derive the driver's vehicle usage pattern, based on the monitoring result obtained in the network state monitoring step S100.

That is, the vehicle usage pattern learning step S200 can calculate a vehicle usage probability by time of each day of the week by determining that the vehicle is not used when the vehicle network is in the sleep state and determining that the vehicle is used when the vehicle network is in the wakeup state, for example.

In addition, the vehicle usage pattern learning step S200 can set a plurality of sections by grouping the vehicle usage probability for each predetermined range, and differentially set and store in the memory a load to which the power supply from the battery is to be cut off in each section when the vehicle is stopped.

In this case, in the vehicle usage pattern learning step S200, the load range can be set likely as a first-phase cut-off load range, a second-phase cut-off load range, and a third-phase cut-off load range, for example, which can be set to be applied sequentially in a time basis in the conventional method. However, the typical phased cut-off method can require the continuation of the CAN sleep state for a certain period of time to cut off the first-phase, second-phase, and third-phase cut-off loads, respectively, for example. In contrast, the vehicle usage pattern learning step S200 can determine a range of loads to be cut off all at once based on the vehicle usage probability of a current time point without the continuation of a certain period of time.

For example, as shown in FIG. 5, the vehicle usage pattern learning step S200 can set a case in which the vehicle usage probability is less than 20% as a first section, and set the power supply cut-off to be performed all at once on all the loads of the first-phase cut-off load range, the second-phase cut-off load range, and even the third-phase cut-off load range that requires a great amount of time to be booted when reconnected, in a time period corresponding to the first section with a relatively low vehicle usage probability.

In addition, still referring to FIG. 5, the vehicle usage pattern learning step S200 can set a case in which the vehicle usage probability is 20% or greater to less than 70% as a second section, and set the power supply cut-off to be performed all at once on only the first-phase cut-off load range and the second-phase cut-off load range, excluding the third-phase cut-off load range, in a time period corresponding to the second section in preparation for a case in which the driver occasionally uses the vehicle, for example.

In addition, still referring to FIG. 5, the vehicle usage pattern learning step S200 can set a case in which the vehicle usage probability is 70% or greater to less than 90% as a third section, and set the power supply cut-off to be performed only on the first-phase cut-off load range in a time period corresponding to the third section in which the vehicle is frequently used, for example.

In addition, still referring to FIG. 5, the vehicle usage pattern learning step S200 can set a case in which the vehicle usage probability is 90% or greater as a fourth section, and set the power supply cut-off not to be performed on all the loads because the driver is expected to use the vehicle in a time slot corresponding to the fourth section, for example.

In this case, the vehicle usage pattern learning step S200 can set differently a range of the vehicle usage probability that is used to set each section and can also set differently a range of loads to which the power supply is cut off in each section or the number of sections, without limitations to the examples described above.

In an embodiment, the cut-off range determining step S300 can, via the ICU, compare a current time point to the time zones of the sections of the vehicle usage pattern and determine the section whose time zone the current time point is matched to, and determine the corresponding range of loads to be cut off which is set for the section.

In an embodiment, the cut-off range determining step S300 can narrow the range of loads to be cut off as the vehicle usage probability is high, and expand the range of loads to be cut off as the vehicle usage probability is low. Accordingly, it can set the second-phase cut-off load range to be further applied, in addition to the first-phase cut-off load range that is applied in the third section, because the vehicle usage probability is lower in the second section, and also can set even the third-phase cut-off load range to be applied, in addition to the first-phase cut-off load range and the second-phase cut-off load range, in the first section in which the vehicle usage probability is lower than in the second section.

In an embodiment, the cut-off executing step S400 can, via the ICU, cut off all at once the power supply to loads belonging to the cut-off range matched to the determined section and can thus reduce the dark current.

In addition, in an embodiment, the dark current cut-off method can further include a cut-off range changing step S500 that, when the section determined in the cut-off range determining step S300 is changed by the lapse of time, after the power supply to a certain load is cut off by the cut-off executing step S400, can change the range of loads to be cut off in response to the changed section.

Accordingly, when the section that is used as the basis for determining the cut-off range is changed by the lapse of time, the cut-off range changing step S500 can control the cut-off range to be changed to a range of loads corresponding to the changed section.

As an example of changing the cut-off range, when the vehicle usage pattern is changed from the third section to the first section by the lapse of time, the cut-off range changing step S500 can immediately change from a state in which only the first-phase cut-off load range is applied to a state in which the second-phase cut-off load range and the third-phase cut-off load range are all applied.

That is, when the vehicle usage pattern is changed from a section with a narrow range of loads to be cut off to a section with a wide range of loads to be cut off as the vehicle usage probability decreases by the lapse of time, the cut-off range changing step S500 can expand the range of loads to be cut off.

In addition to such a case of expanding the range of loads to be cut off as described above, when the vehicle usage pattern is changed from the first section to the second section by the lapse of time, the cut-off range changing step S500 can connect power to the loads of the third-phase cut-off load range in a complete cut-off state before the second section starts, and can thereby improve the driver's convenience in using the vehicle, for example.

That is, when the vehicle usage pattern is changed from a section with a wide range of loads to be cut off to a section with a narrow range of loads to be cut off as the vehicle usage probability increases by the lapse of time, the cut-off range changing step S500 can reduce the range of loads to be cut off by connecting power beforehand to a load that is not cut off in the changed section before the time section of the changed section starts, for example.

In this case, when the time section is changed from the first section to the second section, the cut-off range changing step S500 can execute pre-booting by connecting power to the loads of the third-phase cut-off load range that requires a great amount of time to be booted a predetermined period of time (e.g., approximately 10 minutes) before the second section starts, and can connect power to the loads of both the first-phase cut-off load range and the second-phase cut-off load range at a time point (e.g., approximately 10 am) at which the second section starts, thereby contributing to improving the driver's convenience in using the vehicle, for example.

The dark current cut-off method according to an embodiment of the present disclosure can further include a cut-off stopping step, before the cut-off range determining step S300, that, when the driver does not desire the load cut-off control based on the vehicle usage pattern, stops executing the load cut-off control by using, for example, a mobile application installed on a smartphone owned by the driver or an AVN provided in the vehicle.

Accordingly, in a case in which the driver uses the vehicle for an unusual event such as a trip or a business trip, it is possible to prevent inconvenience that can be caused by an undesirable cut-off of the power supply to loads from a past vehicle usage pattern.

The present disclosure described above can be embodied as computer-readable code on a medium in which a program is recorded, for example. The computer-readable medium can include all types of recording devices in which data readable by a computer system is stored. Examples of the computer-readable medium can include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, and the like, for example.

Therefore, the foregoing detailed description should not be construed as restrictive but be considered illustrative in all respects. The scope of the present disclosure should be determined by a reasonable interpretation of the appended claims, and all modifications within the equivalent scope of the present disclosure are considered included in the scope of the present disclosure.

What is claimed is:

1. An apparatus for reducing current-drainage from a battery of a vehicle, the apparatus comprising:
   one or more processors;
   a non-transitory computer-readable storage medium storing instructions for execution by the one or more processors;
   a network monitor configured to monitor a network state;
   a vehicle usage pattern learner executing on the one or more processors and configured to:
   determine a usage pattern of the vehicle by time of each day of a week based on a monitoring result of the network monitor;
   determine sections of the usage pattern based on a vehicle usage probability;
   determine at least one predetermined cut-off load range to apply for each of the sections according to the vehicle usage probability; and
   determine cut-off load ranges for respective sections of the usage pattern to store in a memory;

a cut-off determiner executing on the one or more processors and configured to:
compare a time point at which the vehicle is turned off to a time range of each of the sections; and
determine at least one power load to cut off; and
a cut-off executor configured to cut off power to the at least one power load,
wherein:
the at least one predetermined cut-off load range includes a first-phase cut-off load range, a second-phase cut-off load range, and a third-phase cut-off load range, and
the first-phase cut-off load range, the second-phase cut-off load range, and the third-phase cut-off load range are each set to be applied in response to the vehicle usage probability being less than 20%.

2. The apparatus of claim 1, wherein both the first-phase cut-off load range and the second-phase cut-off load range are also set to be applied in response to the vehicle usage probability being equal to or greater than 20% and less than 70%.

3. The apparatus of claim 2, wherein only the first-phase cut-off load range is also set to be applied in response to the vehicle usage probability being equal to or greater than 70% and less than 90%.

4. The apparatus of claim 1, wherein:
the cut-off load ranges are differently set in phase,
the vehicle usage pattern learner is further configured to determine one of the cut-off load ranges for each of the sections, and
the cut-off determiner is further configured to determine to apply a one and lower phase one of the cut-off load ranges for each of the sections.

5. The apparatus of claim 4, further comprising a cut-off range changer configured to change a cut-off load range for a section in response to the section being changed by time.

6. The apparatus of claim 5, wherein the cut-off range changer is further configured to change the cut-off load range to a higher phase one in response to a vehicle usage probability for the section being decreased.

7. The apparatus of claim 5, wherein the cut-off range changer is further configured to:
change the cut-off load range to a lower phase one in response to a vehicle usage probability for the section being increased; and
connect a power load that is not cut off in the changed section before the changed section starts.

8. A method of reducing current-drainage from a battery of a vehicle, the method comprising:
monitoring a network state of the vehicle;
learning a vehicle usage pattern, the learning of the vehicle usage pattern comprising:
determining a usage pattern of the vehicle by time of each day of a week based on a monitoring result of the network monitoring;
determining sections of the usage pattern based on a vehicle usage probability;
determining at least one predetermined cut-off load range to apply for each of the sections according to the vehicle usage probability; and
storing the determined cut-off load ranges in a memory;
comparing a time point at which the vehicle is turned off to a time range of each of the sections;
determining at least one power load to cut off; and
cutting off power to the at least one power load,
wherein:
the at least one predetermined cut-off load range includes a first-phase cut-off load range, a second-phase cut-off load range, and a third-phase cut-off load range, and
the first-phase cut-off load range, second-phase cut-off load range, and the third-phase cut-off load range are each set to be applied in response to the vehicle usage probability being less than 20%.

9. The method of claim 8, wherein both the first-phase cut-off load range and the second-phase cut-off load range are also set to be applied in response to the vehicle usage probability being equal to or greater than 20% and less than 70%.

10. The method of claim 9, wherein only the first-phase cut-off load range is also set to be applied in response to the vehicle usage probability being equal to or greater than 70% and less than 90%.

11. The method of claim 10, further comprising changing a cut-off range of a cut-off load range for a section in response to the section being changed by time.

12. The method of claim 11, wherein the changing of the cut-off range comprises changing the cut-off load range to a higher phase one in response to the vehicle usage probability for the section being decreased.

13. The method of claim 11, wherein changing of the cut-off range comprises:
changing the cut-off load range to a lower phase one in response to the vehicle usage probability for the section being increased; and
connecting a power load that is not cut off in the changed section before the changed section starts.

14. A non-transitory computer-readable storage medium storing computer-readable instructions configured to cause a computer processor to perform operations comprising:
monitoring a network state of a vehicle;
learning a vehicle usage pattern, the learning of the vehicle usage pattern comprising:
determining a usage pattern of the vehicle by time of each day of a week based on a monitoring result of the network monitoring,
determining sections of the usage pattern based on a vehicle usage probability;
determining at least one predetermined cut-off load range to apply for each of the sections according to the vehicle usage probability; and
storing the determined cut-off load ranges in a memory;
comparing a time point at which the vehicle is turned off to a time range of each of the sections;
determining at least one power load to cut off; and
cutting off power to the at least one power load,
wherein:
the at least one predetermined cut-off load range includes a first-phase cut-off load range, a second-phase cut-off load range, and a third-phase cut-off load range, and
the first-phase cut-off load range, second-phase cut-off load range, and the third-phase cut-off load range are each set to be applied in response to the vehicle usage probability being less than 20%.

* * * * *